US009405760B2

(12) United States Patent
Shibao

(10) Patent No.: US 9,405,760 B2
(45) Date of Patent: Aug. 2, 2016

(54) INFORMATION PROCESSING APPARATUS, METHOD OF CONTROLLING THE SAME, AND STORAGE MEDIUM

(75) Inventor: Koki Shibao, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 333 days.

(21) Appl. No.: 12/999,159

(22) PCT Filed: Jun. 26, 2009

(86) PCT No.: PCT/JP2009/062158
§ 371 (c)(1),
(2), (4) Date: Dec. 15, 2010

(87) PCT Pub. No.: WO2010/001979
PCT Pub. Date: Jan. 7, 2010

(65) Prior Publication Data
US 2011/0125768 A1     May 26, 2011

(30) Foreign Application Priority Data

Jun. 30, 2008 (JP) .................................. 2008-170749

(51) Int. Cl.
*G06F 12/00* (2006.01)
*G06F 17/30* (2006.01)
(52) U.S. Cl.
CPC .............................. *G06F 17/30123* (2013.01)
(58) Field of Classification Search
CPC ................................................ G06F 17/30123
USPC .................. 707/600, 607–609, 705, 812, 821
See application file for complete search history.

(56) References Cited

U.S. PATENT DOCUMENTS

| 5,479,167 A | 12/1995 | Murakami |
| 5,715,397 A * | 2/1998 | Ogawa .............. G06F 17/30569 370/420 |

(Continued)

FOREIGN PATENT DOCUMENTS

| JP | 7-175629 A | 7/1995 |
| JP | 10-320171 A | 12/1998 |

(Continued)

OTHER PUBLICATIONS

European Search Report issued in European counterpart application No. EP09773557.5, dated Oct. 5, 2012.

(Continued)

*Primary Examiner* — Taelor Kim
(74) *Attorney, Agent, or Firm* — Rossi, Kimms & McDowell LLP

(57) ABSTRACT

An information processing apparatus capable of reliably accessing files associated with file identification information generated based on more character code systems, without necessitating a large-capacity memory. When the information processing apparatus (MFP) acquires file identification information, a CPU of the MFP determines whether or not the MFP is capable of performing processing based on a predetermined character code system used for describing the identification information. When the MFP is not capable of performing processing based on the character code system, the CPU converts the identification information described in the predetermined character code system into substitute character codes processable thereby. Then, the CPU registers the substitute character codes and the original character codes before the conversion in a map table in association with each other. When the processing on the file is completed, the CPU deletes the substitute character codes and the original character codes from the map table.

27 Claims, 14 Drawing Sheets

(56) References Cited

U.S. PATENT DOCUMENTS

| | | | |
|---|---|---|---|
| 5,745,902 A * | 4/1998 | Miller et al. | |
| 6,144,969 A * | 11/2000 | Inokuchi et al. | 707/705 |
| 6,286,013 B1 * | 9/2001 | Reynolds et al. | 719/328 |
| 6,628,417 B1 * | 9/2003 | Naito et al. | 358/1.15 |
| 7,155,676 B2 * | 12/2006 | Land et al. | 715/731 |
| 7,991,781 B2 * | 8/2011 | Day et al. | 707/756 |
| 2003/0163802 A1 * | 8/2003 | Takahashi | 717/136 |
| 2005/0165721 A1 * | 7/2005 | Inkinen | 707/1 |
| 2006/0092480 A1 * | 5/2006 | Cui et al. | 358/474 |
| 2008/0154978 A1 * | 6/2008 | Lemar et al. | 707/201 |
| 2010/0017373 A1 * | 1/2010 | Harada et al. | 707/3 |
| 2011/0128589 A1 * | 6/2011 | Hasegawa | 358/451 |

FOREIGN PATENT DOCUMENTS

| | | |
|---|---|---|
| JP | 2000-020280 A | 1/2000 |
| JP | 2002-007182 A | 1/2002 |
| JP | 2003-228502 A | 8/2003 |
| JP | 2005-222483 A | 8/2005 |

OTHER PUBLICATIONS

International Search Report and Written Opinion issued in related PCT/JP2009/062158 mailed Aug. 18, 2009.

Umehara, Kei. "Combat with Samba (No. 4)", Linux Magazine, Feb. 1, 2000, vol. 2, No. 2, pp. 219-223. Full English translation provided. Cited in Int.'l Search Rpt.& Written Opinion issued in rel. PCT/JP2009/062158 mailed Aug. 18, 2009.

* cited by examiner

FIG.7

| | |
|---|---|
| ORIGINAL FILE NAME | ?FILE-001 |
| ORIGINAL DIRECTORY NAME | ?DIR-001 |

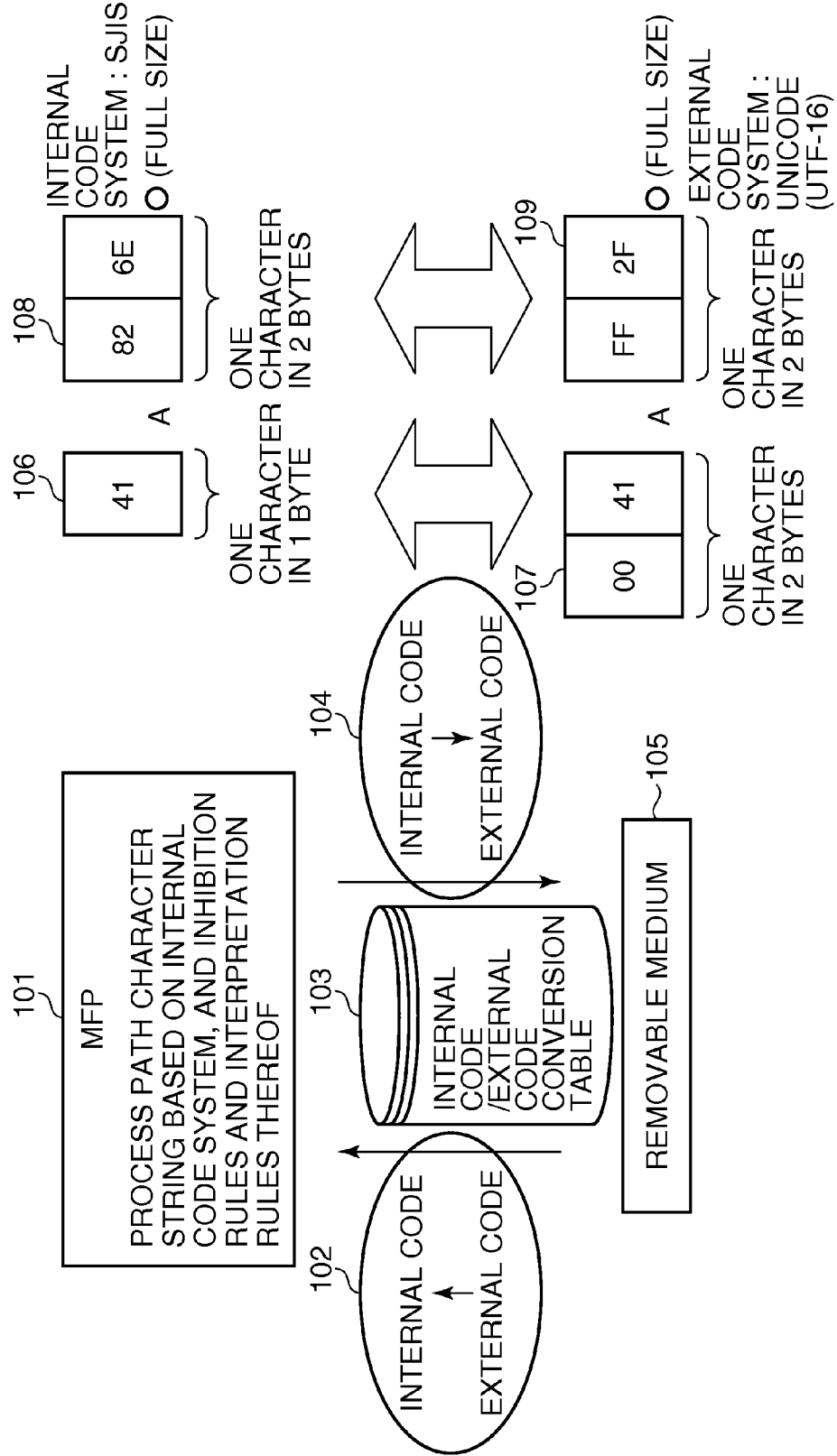

INFORMATION PROCESSING APPARATUS, METHOD OF CONTROLLING THE SAME, AND STORAGE MEDIUM

This application is a U.S. National Phase Application of PCT International Application PCT/JP2009/062158 filed on Jun. 26, 2009 which is based on and claims priority from JP 2008-170749 filed on Jun. 30, 2008 the contents of which is incorporated herein in its entirety by reference.

TECHNICAL FIELD

The present invention relates to a technique for accessing files stored in a removable medium in an information apparatus, without via a PC, and more particularly to a technique of converting character codes representative of a file name.

BACKGROUND ART

A recent information apparatus is capable of accessing a removable medium without via a personal computer (hereinafter acronymized as "PC"). For example, a multifunction peripheral (MFP) having a port for access to files in a removable medium and a function of inputting and outputting images has appeared on the market.

Each of the files is stored in the removable medium, always with a file name assigned thereto. The file name consists of a plurality of characters. Each of the characters is represented by a character code of one or more bytes.

In general, a character code system used in UI (user interface) display or within an information apparatus (hereinafter referred to as "the internal code system") is selected from character code systems widely used in each country. In Japan, for example, SJIS (Shifted JIS Code) or EUC (Extended UNIX (registered trademark) Code) is generally used.

On the other hand, as for file names and external codes distributed all over the world, it is preferred, in view of compatibility, that they can be commonly handled anywhere in the world, and therefore Unicode or ASCII code is generally used as an external code system. For example, the Microsoft FAT file system as a file system for handling files within a removable medium also employs Unicode for long file names. For this reason, files on a FAT file system basically can be properly accessed in any country.

Thus, in general, an information apparatus selectively uses an external code system and an internal code system, and hence the information apparatus is required to have a mutual conversion function for conversion between the two character code systems so as to properly access a file within a removable medium. This mutual conversion function for conversion between character codes requires a huge character code conversion table so as to support a language having a system to which a fixed mechanical conversion rule cannot be applied. Further, in an information apparatus, it is required to set forbidden characters and perform interpretation of characters, according to each internal code system.

Now, basic character code conversion processing will be described with reference to FIG. 14. FIG. 14 exemplifies a case where two characters "A (half size)" and "O (full size)" are transferred between an MFP main unit 101 and a removable medium 105. Further, in FIG. 14, it is assumed that SJIS is used within the MFP main unit 101 as an internal code system, and Unicode (UTF-16) is used for the removable medium 105 as an external code system.

The character "A (half size)" on the removable medium 105 is represented by 2 bytes of "0x0041" as denoted by reference numeral 107. In order to use this character code in the MFP main unit 101, it is required to perform external code-to-internal code conversion (see reference numeral 102). In this case, the MFP main unit 101 refers to an internal code/external code conversion table 103 to thereby convert the external code "0x0041", denoted by reference numeral 107, of Unicode (UTF-16) into the internal code "0x41", denoted by reference numeral 106, of the SJIS.

Similarly, the MFP main unit 101 refers to the internal code/external code conversion table 103 to thereby convert a Unicode character "O (full size): 0xFF2F" into an SJIS character "O (full size): 0x826E" (see reference numerals 109 and 108).

Further, the conversion between the internal code system and the external code system is required to be performed in a reversible manner, and in the case of writing a file processed in the MFP main unit 101 into the removable medium 105, the MFP main unit 101 converts internal codes representative of the name of the file into external codes representative of the same (see reference numeral 104).

Next, a description will be given of problems of a case where the above-described character code conversion processing is not executed. For example, in the case of "0x0041" representative of "A (full size)", a character string including the character comes to include "0x00". In the handling of a character string in general information processing, "0x00" is used as a termination code. Therefore, there is a possibility that such a character string including the termination code is broken at an intermediate point.

On the other hand, in the case of "0xFF2F" representative of the character "O (full size)", it includes "0x2F" as a second byte. In SJIS, "0x2F" in one byte represents "/", and hence when a character string including this character code is used as a file name, the file name can be erroneously recognized as a different file name. To have a character string broken or erroneously recognized means that it is impossible for the information apparatus to properly access a file based on a file name.

Therefore, particularly for properly handling multi-byte character strings in an information apparatus, execution of the character code conversion processing and the use of the character code conversion table are indispensable. However, the internal code system differs from language to language, and hence character code conversion tables are needed which correspond in number to the number of languages to be supported by the information apparatus.

Among information apparatuses, PCs, which have abundant available memory resources, are capable of storing, in advance, character code conversion tables associated with respective various languages as part of an OS (Operating System). However, it is practically impossible for MFPs, which have scarce available memory resources, to store character code conversion tables associated with respective various languages.

To cope with this problem, a technique disclosed in PTL (Patent Literature) 1 mentioned below has been developed. According to PTL (Patent Literature) 1, character codes extracted from input data are converted into character codes of another character code system by referring to a code conversion table, and are then output.

According to the invention disclosed in PTL (Patent Literature) 1, in the case of handling an undefined character code, i.e. a character code unconvertible using the code conversion table, the original character code is converted into a substitute code and then output while storing the original character code and an output position in a table. Thus, the invention disclosed in PTL (Patent Literature) 1 makes it possible to eliminate the need to prepare code conversion tables associated with all languages (character code systems) to thereby contribute to resource saving.

However, in the method used in PTL (Patent Literature) 1, with an increase in the number of undefined character code systems, the frequency of use of a substitute code is increased, which increases the probability of duplication of file names. This can eventually cause files incapable of being properly accessed to eventually appear.

CITATION LIST

Patent Literature

{PTL 1} Japanese Patent Laid-Open Publication No. H10-320171

SUMMARY OF INVENTION

Technical Problem

The present invention has been made in view of the above-described background, and an object thereof is to make it possible reliably access files associated with file identification information generated based on more character code systems, without necessitating a large-capacity memory.

Solution to Problem

Accordingly, a first aspect of the present invention provides information processing apparatus for processing a received file, comprising an acquisition unit configured to acquire identification information for identifying the file, the identification information being described using predetermined character codes, a determining unit configured to determine whether or not the information processing apparatus is capable of performing processing based on the predetermined character codes, a conversion unit configured to be operable when the determining unit determines that the information processing apparatus is not capable of performing processing based on the predetermined character codes, to convert the identification information described using the predetermined character codes into identification information using substitute character codes processable by the information processing apparatus, a storing unit configured to store the substitute character codes representative of the identification information after conversion by the conversion unit and the character codes representative of the identification information before the conversion in a memory in association with each other, and a deletion unit configured to be operable when the processing on the file is completed, to delete the substitute character codes associated with the file and the character codes before the conversion from the memory.

Accordingly, a second aspect of the present invention provides a method of controlling an information processing apparatus for processing a received file, comprising an acquisition step of acquiring identification information for identifying the file, the identification information being described using predetermined character codes, a determining step of determining whether or not the information processing apparatus is capable of performing processing based on the predetermined character codes, a conversion step of converting, when it is determined in the determining step that the information processing apparatus is not capable of performing processing based on the predetermined character codes, the identification information described using the predetermined character codes into identification information using substitute character codes processable by the information processing apparatus, a storing step of storing the substitute character codes representative of the identification information after conversion in the conversion step and the character codes representative of the identification information before the conversion in a memory in association with each other, and a deletion step of deleting, when the processing on the file is completed, the substitute character codes associated with the file and the character codes before the conversion from the memory.

Accordingly, a third aspect of the present invention provides a computer-readable storage medium storing a program for causing a computer to execute a method of controlling an information processing apparatus for processing a received file, wherein the method comprises an acquisition step of acquiring identification information for identifying the file, the identification information being described using predetermined character codes, a determining step of determining whether or not the information processing apparatus is capable of performing processing based on the predetermined character codes, a conversion step of converting, when it is determined in the determining step that the information processing apparatus is not capable of performing processing based on the predetermined character codes, the identification information described using the predetermined character codes into identification information using substitute character codes processable by the information processing apparatus, a storing step of storing the substitute character codes representative of the identification information after conversion in the conversion step and the character codes representative of the identification information before the conversion in a memory in association with each other, and a deletion step of deleting, when the processing on the file is completed, the substitute character codes associated with the file and the character codes before the conversion from the memory.

Advantageous Effects of Invention

According to the present invention, it is possible to reliably access files associated with file identification information generated based on more character code systems, without necessitating a large-capacity memory.

The features and advantages of the invention will become more apparent from the following detailed description taken in conjunction with the accompanying drawings.

BRIEF DESCRIPTION OF DRAWINGS

FIG. 7 is a diagram useful in explaining substitute file/directory names registered in a map table.

FIG. 14 is a conceptual diagram useful in explaining basic character code conversion processing.

DESCRIPTION OF EMBODIMENTS

The present invention will now be described in detail below with reference to the drawings showing an embodiment thereof.

Figure 1:
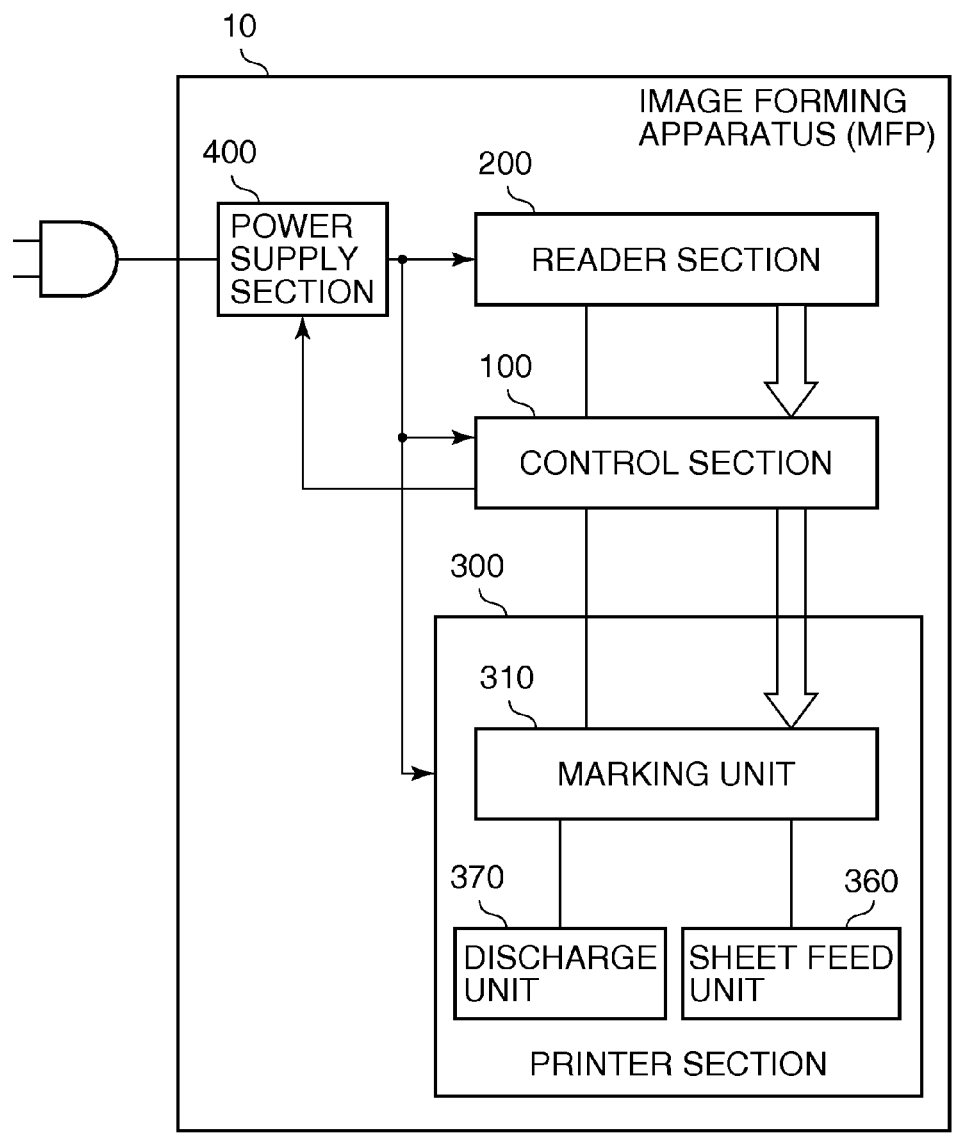
FIG. 1 is a block diagram of an image forming apparatus (MFP) according to an embodiment of the present invention.

FIG. 1 is a block diagram of an image forming apparatus (MFP) according to the embodiment of the present invention. The image forming apparatus 10 is comprised of a control section 100, a reader section (image input device) 200, a printer section (image output device) 300, and a power supply section 400.

The reader section 200 optically reads an original image and converts the read image into electronic image data by a photoelectric conversion element (not shown), followed by outputting the electronic image data to the control section 100. The reader section 200 is comprised of a scanner unit (not shown) for reading an image on an original sheet (original image), and an original sheet feed unit (not shown) for feeding original sheets.

The printer section 300 conveys a recording sheet, prints image data as a visible image on the recording sheet, and discharges the recording sheet from the apparatus. The printer section 300 is comprised of a sheet feed unit 360, a marking unit 310, and a discharge unit 370. The sheet feed unit 360 is provided with a plurality of types of recording sheet cassettes (not shown), and supplies the marking unit 310 with sheets contained in the recording sheet cassettes. The marking unit 310 converts image data output from the reader section 200 into a visible image by electrophotography or the like printing method, and transfers and fixes the image onto a recording sheet. The discharge unit 370 sorts or staples recording sheets each having an image transferred and fixed thereon, and then discharges the recording sheets from the apparatus.

The control section 100 is electrically connected to the reader section 200 and the printer section 300. Further, the control section 100 is connected to a host computer (not shown) via a network.

The control section 100 controls the reader section 200 to read original image data, and controls the printer section 300 to provide a copy function for printing image data on a recording sheet. Further, the control section 100 provides a scanner function for encoding and compressing image data read by the reader section 200 and transmitting the encoded and compressed image data to various servers via the network. Furthermore, the control section 100 provides a printer function for converting code data received from the host computer via the network into image data and outputting the image data to the printer section 300.

It should be noted that the control section 100 also performs various kinds of control in causing the printer section 300 to print image data stored in a removable medium (not shown). In this case, the control section 100 performs access control unique to the present embodiment for acquisition of an image file stored in the removable medium. This access control for access to the removable medium will be described in detail hereinafter.

Figure 2:
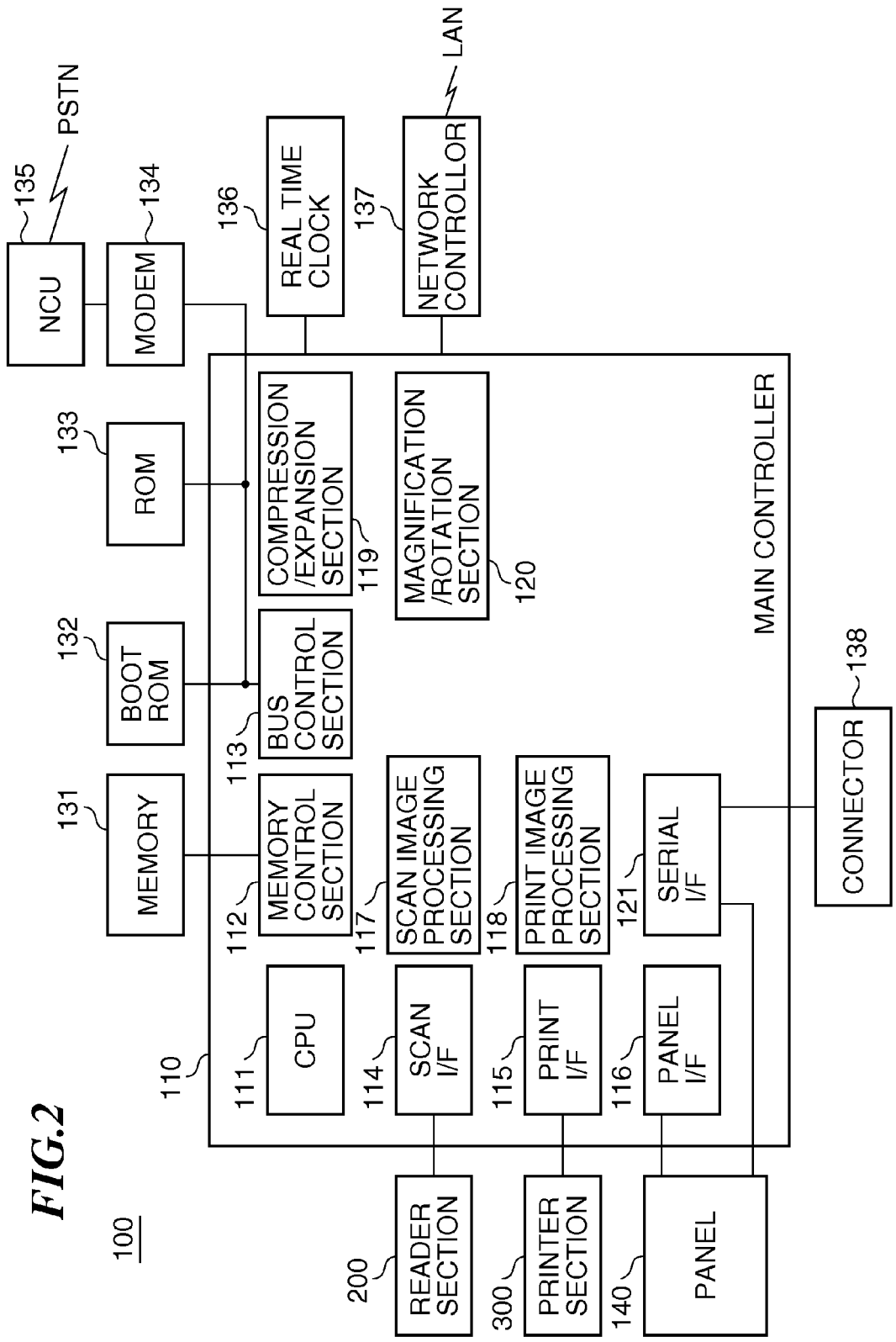
FIG. 2 is a block diagram of a control section of the image forming apparatus in FIG. 1.

Next, the configuration of the control section 100 will be described with reference to FIG. 2. A main controller 110 includes a CPU 111, a memory control section 112, a bus control section 113, a scan interface 114, a print interface 115, and a panel interface 116. Further, the main controller 110 includes a scan image processing section 117, a print image processing section 118, a compression/expansion section 119, a magnification/rotation section 120, and a serial interface 121.

The CPU 111 controls the overall operation of the control section 100 and operates based on programs stored in a memory 131, a ROM 133, and so forth. The programs include a program for interpreting PDL (Page Description Language) code data received from a host computer and converting the data into raster image data.

The memory control section 112 controls transfer of data input and output from the interfaces, under the control of the CPU 111, and performs bus contention arbitration and control of DMA data transfer. The bus control section 113 controls access to a boot ROM 132, the ROM 133, and a modem 134.

The scan interface 114 receives image data input from the reader section 200, and transfers the image data to the memory 131 or the scan image processing section 117. The scan image processing section 117 performs predetermined image processing on image data received from the scan interface 114. This image processing includes line pitch correction, offset correction, nonlinear correction, color space matching, MTF (Modulation Transfer Function) correction, space filtering, achromatic color determination, and the like processing.

The print interface 115 generates a control signal based on a video control signal delivered from the printer section, and outputs a video signal in accordance with the control signal. The print image processing section 118 has a function of receiving raster image data from the memory 131, performing image processing on the raster image data, and outputting the processed image data to the memory 131. This image processing includes color space compression, background removal, log conversion, nonlinear color space conversion, random number addition, gamma conversion, error diffusion processing, screen processing, and so forth.

The compression/expansion section 119 encodes and compresses raster image data stored in the memory 131, using one of methods including MH, MR, MMR, JBIG, and JPEG. Further, the compression/expansion section 119 expands compressed and stored code data into raster image data and stores the raster image data in the memory 131. The magnification/rotation section 120 performs processing for enlarging or reducing the size of raster image data stored in the memory 131, and rotation processing for rotating the raster image data through 90 degrees, 180 degrees, 270 degrees or the like.

The boot ROM 132 stores a boot program based on which the CPU 111 performs various kinds of boot processes. The ROM 133 is used for storage of various kinds of application programs, configuration information, and font data. The various application programs include an application program in which commands for executing processes as illustrated in respective flowcharts in FIGS. 5 and 6, FIGS. 8 and 9, and FIGS. 11 to 13 are combined in a computer-executable manner.

It should be noted that the ROM 133 also stores a character code conversion table (not shown) to be referred to for access to image files having file/directory names described by various kinds of character codes of different character code systems.

Figure 4:
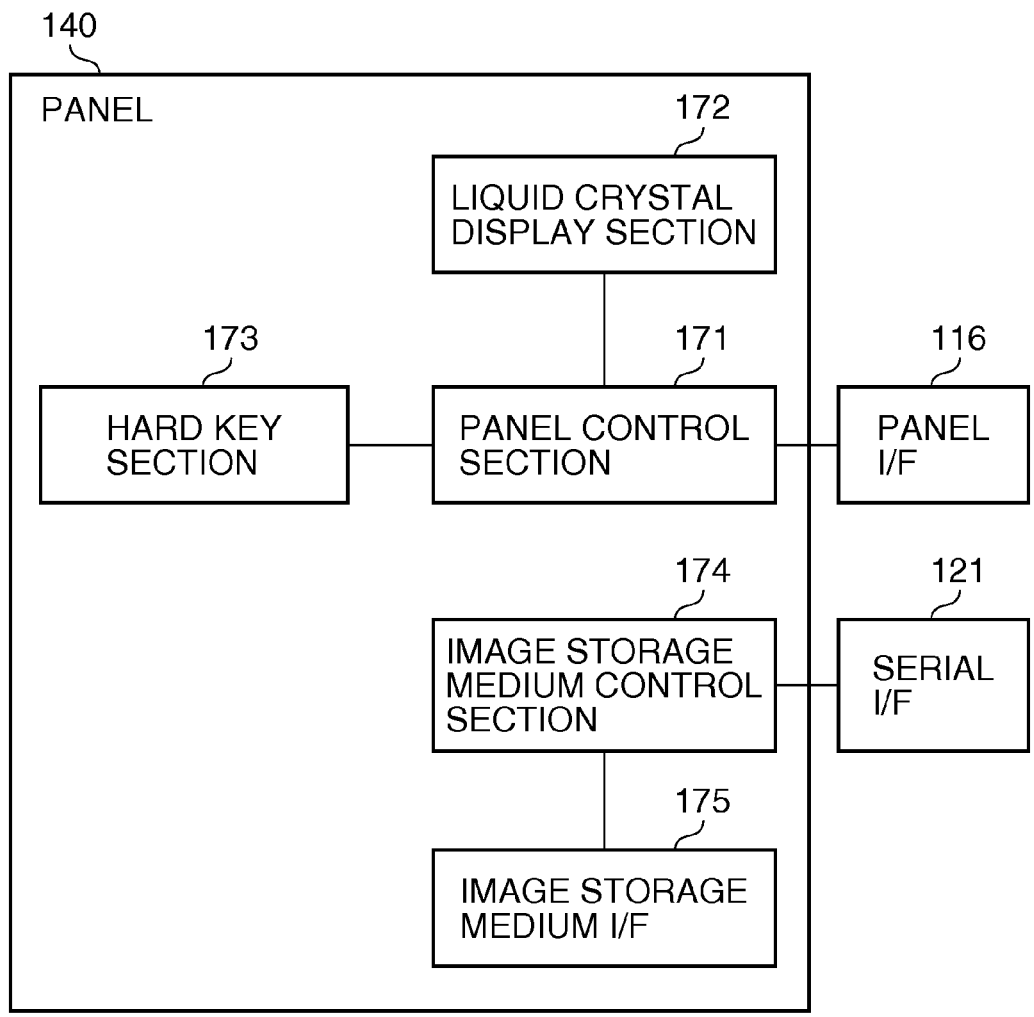
FIG. 4 is a block diagram of a panel appearing in FIG. 2.
Figure 10:
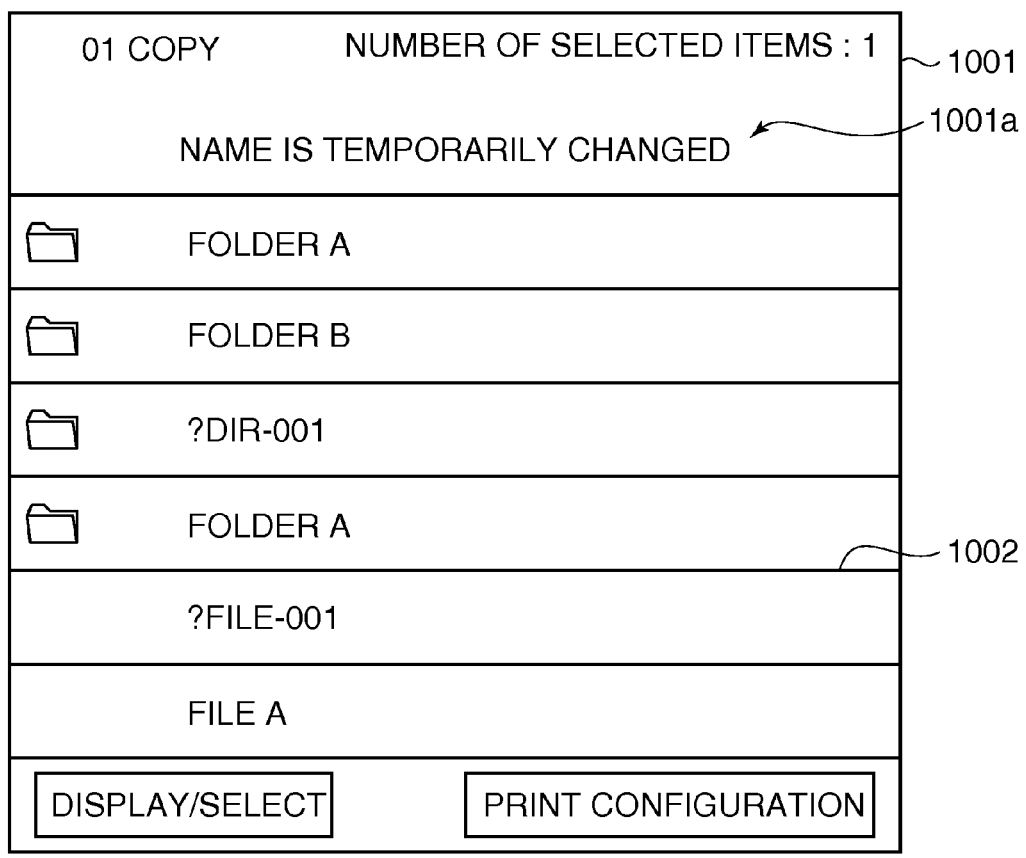
FIG. 10 is a view useful in explaining a method of displaying file/directory names.

The panel interface 116 performs communication with a panel 140. As shown in FIG. 4, the panel 140 has a hard key section 173 comprised of a liquid crystal display section 172 and a plurality of hard keys. Signals input by pressing hard keys are transmitted to the CPU 111 via the panel interface 116. Data output from the panel interface 116 is displayed on the liquid crystal display section 172. Further, various kinds of UI (User Interface) screens including a UI screen shown in FIG. 10 are displayed on the liquid crystal display section 172.

The serial interface 121 performs communication with the host computer and various devices via a connector 138. The serial interface 121 provides interface for receiving PDL data from the host computer. The serial interface 121 is also used for command communication with a recording medium having digital image data recorded thereon or for image transfer.

A modem 146 and an NCU 135 are connected to a public telephone line to control FAX communication. A real-time clock module 136 is used to update and store a date and time managed in the image forming apparatus 10. The real-time clock module 136 is backed up by a backup battery. A network controller 137 is connected to an external network. The network is generally implemented by Ethernet (registered trademark), and the network controller 137 is used for reception of PDL data from the host computer, transmission of scanner image, remote control, and so forth.

Figure 3:
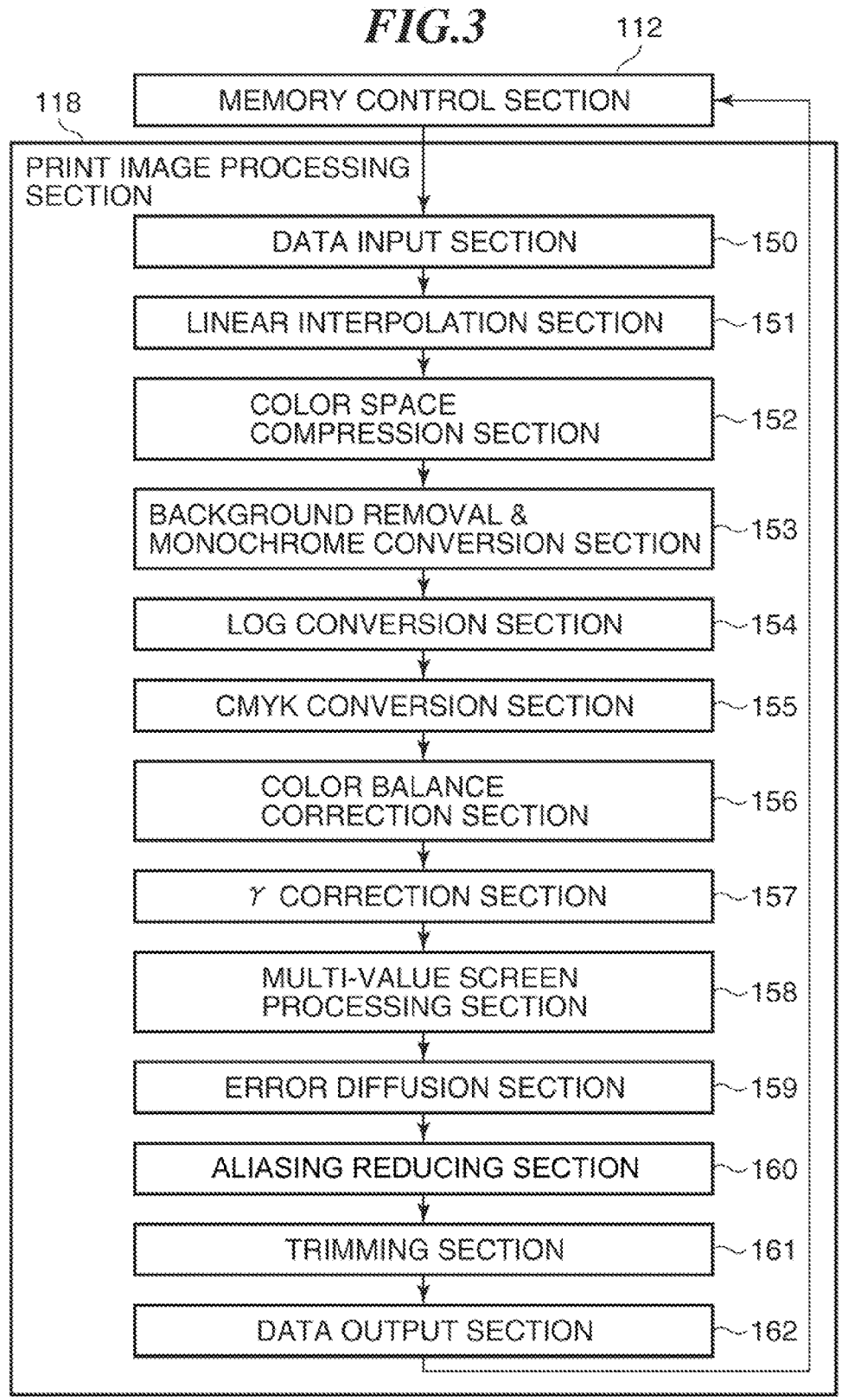
FIG. 3 is a block diagram of a print image processing section in a main controller appearing in FIG. 2.

Next, the print image processing section 118 will be described in detail with reference to FIG. 3. Image data input and output to and from the memory control section 112 is subjected to data format conversion by a data input section 150, and then image enlargement or reduction processing is performed on the image data by a linear interpolation section 151.

A color space compression section 152 compresses the image data received from the linear interpolation section 151 within a color range reproducible by the printer section 300, and then performs adjustment processing, such as chroma adjustment, color phase adjustment, background adjustment, and black area adjustment. Further, when the color space of the input image data is YUV (Y: a luminance signal, U: difference between the luminance signal and a blue component, V: difference between the luminance signal and a red component), the color space compression section 152 converts the YUV color space into the RGB color space.

A background removal & monochrome conversion section 153 performs nonlinear computation on RGB image data to thereby remove a background. Further, when the scan image processing section 117 determines that received image data is achromatic, the background removal & monochrome conversion section 153 performs color-to-monochrome conversion for converting the image data from RGB to monochrome.

A LOG conversion section 154 performs nonlinear conversion using a one-dimensional lookup table to thereby convert image data (image signals) from RGB signals to CMY signals. A CMYK conversion section 155 converts CMY signals into CMYK signals using a three-dimensional lookup table. It should be noted that when the color space of image data received from the memory control section 112 is CMYK, each of the sections ranging from the color space compression section 152 to the CMYK conversion section 155 outputs the received image data to the associated downstream section without processing the same.

A color balance correction section 156 performs image lightness adjustment. A γ correction section 157 performs density adjustment on each of the received CMYK signals using an associated one-dimensional lookup table.

A multi-value screen processing section 158 performs screen processing on received multi-value image data to convert the same into 4-bit, 2-bit, or 1-bit gradation image data. An error diffusion section 159 performs error diffusion processing on received multi-value image data to convert the same into 4-bit, 2-bit, or 1-bit gradation image data.

It should be noted that in the case of subjecting received image data to screen processing, the multi-value screen processing section 158 performs the above-mentioned processing, and the error diffusion section 159 outputs the received data without processing the same. In the case of subjecting received image data to error diffusion processing, the multi-value screen processing section 158 outputs the received data without processing the same, and the error diffusion section 159 performs the above-mentioned processing.

An aliasing reducing section 160 detects an edge part of image data by pattern matching and reduces jaggies (aliasing). A trimming section 161 deletes image data frames or performs masking processing. A data output section 162 outputs image data processed by the upstream sections to the memory control section 112.

Next, the panel 140 functioning as an operating section will be described with reference to FIG. 4. The panel 140 is comprised of a panel control section 171, the liquid crystal display section 172, the hard key section 173, an image storage medium control section 174, and an image storage medium interface 175.

The panel control section 171 is connected to the panel interface 116 of the main controller 110. The panel control section 171 monitors the hard key section 173 and controls display of the liquid crystal display section 172. The panel control section 171 transmits key operation signals generated by the hard key section 173 to the CPU 111 via the panel interface 116. Further, the panel control section 171 controls display of the liquid crystal display section 172 based on control signals input via the panel interface 116.

The image storage medium control section 174 is connected to the serial interface 121 of the main controller 110. The image storage medium control section 174 controls access to an image storage medium mounted in the image storage medium interface 175. The image storage medium is generally implemented e.g. by a removable medium, such as an SD card (registered trademark), a compact flash (registered trademark), or a USB memory.

Figure 5:
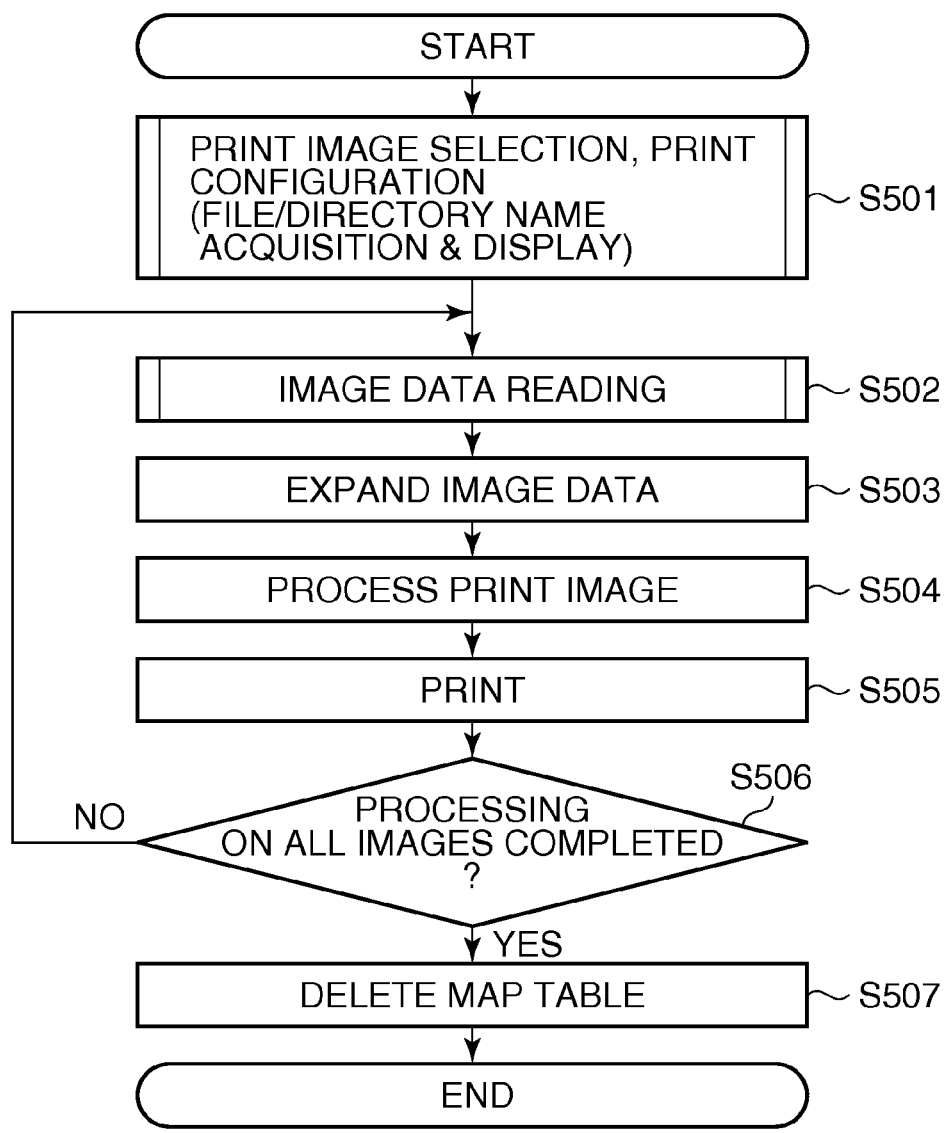
FIG. 5 is a flowchart of an image data printing process executed by the image forming apparatus (MFP) in FIG. 1 so as to print out image data stored in an image storage medium.

FIG. 5 is a flowchart of an image data printing process executed for printing out image data stored in an image storage medium, according to the present embodiment.

In printing out image data stored in an image storage medium (removable medium), the user performs image selection and configures print settings on the panel 140 (S501). In doing this, the CPU 111 executes a file/directory name acquisition process for acquiring file/directory names from the removable medium. Further, the CPU 111 executes processing for generating a map table (see FIG. 7) described hereinafter, as required. Then, the CPU 111 causes the liquid crystal display section 172 to display the acquired file/directory names in a list form (see FIG. 10).

It should be noted that the above-mentioned map table is a buffer table which is used when a file/directory name cannot be converted using the above-mentioned character code conversion table, for assigning a substitute file/directory name described by character codes processable by the CPU 111 to the file/directory name and temporarily storing the same.

Figure 11:
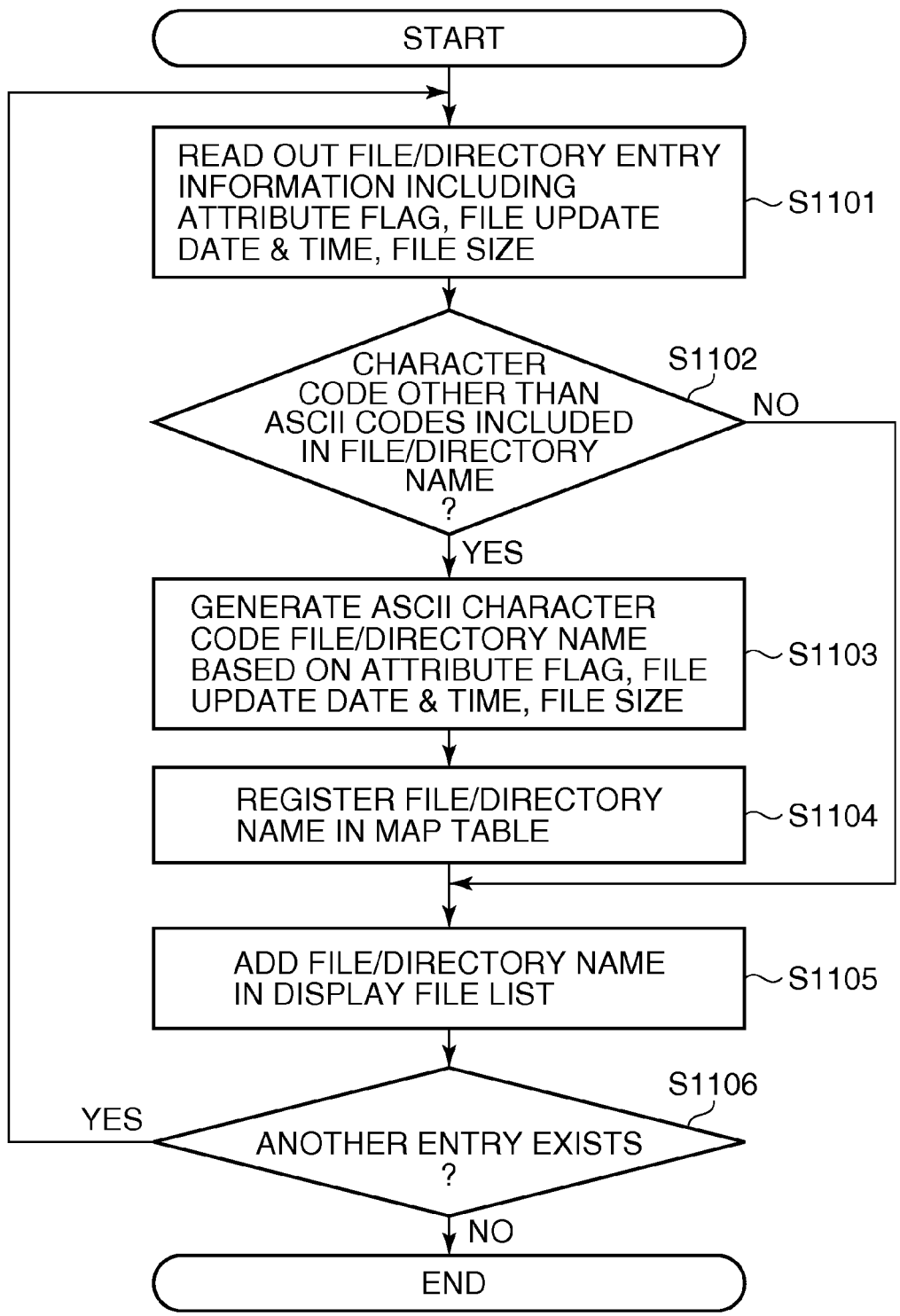
FIG. 11 is a flowchart of a second example of the file/directory name acquisition process executed in the one step in FIG. 5.
Figure 12:
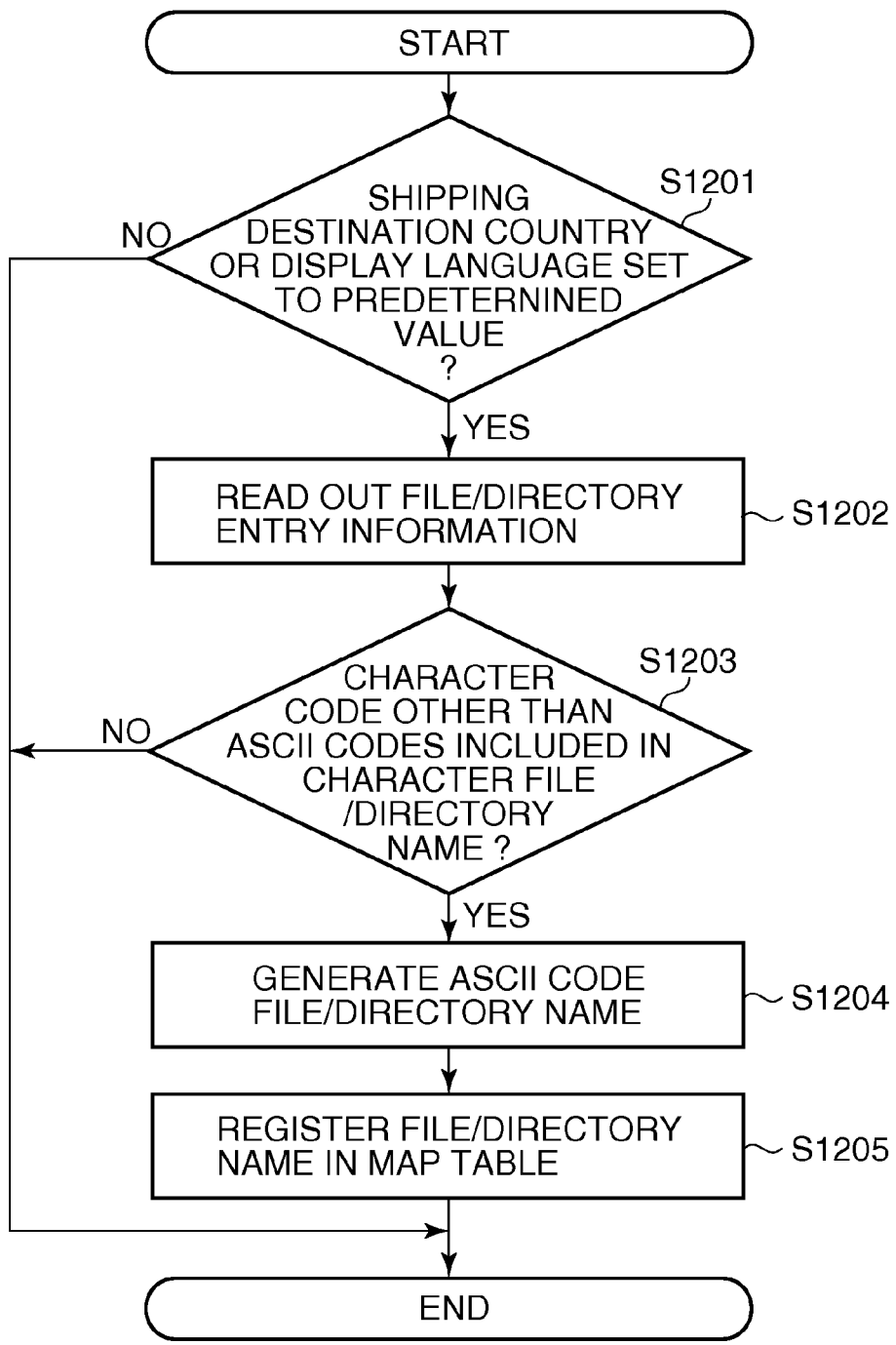
FIG. 12 is a flowchart of a third example of the file/directory name acquisition process executed in the one step in FIG. 5.

First to third examples of the file/directory name acquisition process executed in the step S501 will be described with reference to respective flowcharts shown in FIGS. 6, 11, and 12. Further, first and second examples of a file/directory name display process executed in the step S501 will be described with reference to respective flowcharts shown in FIGS. 9 and 13.

When the user gives an instruction for starting printing from the panel 140, the CPU 111 reads image data (image file) on the removable medium mounted on the image storage medium interface 175 via the serial interface 121 and stores the image data in the memory 131 (S502). In doing this, the CPU 111 reads an image file associated with a file/directory name selected by the user. A first example of the image file reading process will be described hereinafter with reference to the flowchart in FIG. 8.

Next, when the image data stored in the memory 131 is in a compressed form, the CPU 111 expands the image data and stores the expanded image data in the memory 131 (S503). Then, the CPU 111 causes the print image processing section 118 to execute image conversion/manipulation processing based on configuration information configured by the user in the step S501, and stores the processed image data in the memory 131 (S504).

Then, the CPU 111 outputs the image data stored in the memory 131 to the printer section 300 via the printer interface 115 and causes the printer section 300 to print the image data. In doing this, the CPU 111 outputs the image data to the printer section 300 in timing synchronous with reception of a control signal from the printer section 300.

Then, the CPU 111 determines whether or not the image data items selected in the step S501 have all undergone print processing, and if the print processing has not been performed on all the image data items (NO to S506), the process returns to the step S502. On the other hand, if the print processing has been performed on all the image data items (YES to S506) and if the map table described hereinafter has been prepared in the step S501, the map table is deleted (S507).

Next, the first example of the file/directory name acquisition process executed in the step S501 in FIG. 5 will be described with reference to the flowchart in FIG. 6. It should be noted that the other examples (second and third examples) of the file/directory name acquisition process executed in the step S501 in FIG. 5 will be described hereinafter with reference to the respective flowcharts in FIGS. 11 and 12.

The CPU 111 acquires file/directory entry information from the removable medium (S601). The entry information contains a file/directory name as identification information for identifying a file or a directory and a flag for distinction between a file and a directory. In a FAT file system, the entry information is stored in an area called a directory entry. According to the specifications of the FAT file system, in the case of handling a file/directory name represented by multi-byte character codes or a name having a length exceeding a predetermined character length, it is required to convert the file/directory name into Unicode.

Then, the CPU 111 determines whether or not the file/directory name acquired in the step S601 includes any character code other than ASCII codes, i.e. whether or not the file/directory name can be converted using a code conversion table stored in the present apparatus 10 (S602).

The ASCII code is a character code system which represents each character by one byte (7 bits in actuality). Further, the character code system defines the range of numerical values that can be used for representing characters. Therefore, it is possible to determine whether or not the file/directory name acquired in the step S601 consists of ASCII codes alone, by determining whether or not each one byte of the file/directory name falls within the numerical range of the ASCII code.

If the file/directory name does not consist of ASCII codes alone, the associated file cannot be handled properly, and hence a substitute file/directory name consisting of ASCII codes alone is generated (S603). Then, the CPU 111 registers the generated substitute file/directory name, i.e. the file/directory name after the character code conversion, in the map table (S604), and then the present process proceeds to a step S605. It should be noted that in the present embodiment, the map table is assumed to be dynamically formed in the memory 131.

The substitute file/directory name is represented by "prefix+numerical value", as denoted by reference numeral 701a or 702a, so as to secure its uniqueness. The numerical value is incremented whenever a substitute file/directory name is generated. Further, the CPU 111 registers the substitute file/directory name in the map table in association with its original file/directory name.

If the file/directory name consists of ASCII codes alone, the associated file can be handled properly without filename conversion, and hence the CPU 111 skips the steps S603 and S604 for the substitute file/directory name generation and registration processing and proceeds to the step S605.

In the step S605, the CPU 111 adds the original file/directory name acquired from the removable medium or the generated and registered substitute file/directory name to a display file list stored in the memory 131. The display file list is used to display a file list on the liquid crystal display section 172 so as to enable the user to select a file in the step S501 in FIG. 5.

Then, the CPU 111 determines whether or not other file/directory entry information exists (S606). If the entry information exists, the process returns to the step S601, and the steps S601 to S606 are repeatedly carried out. If no other entry information exists, the CPU 111 terminates the file/directory name acquisition process.

Figure 8:
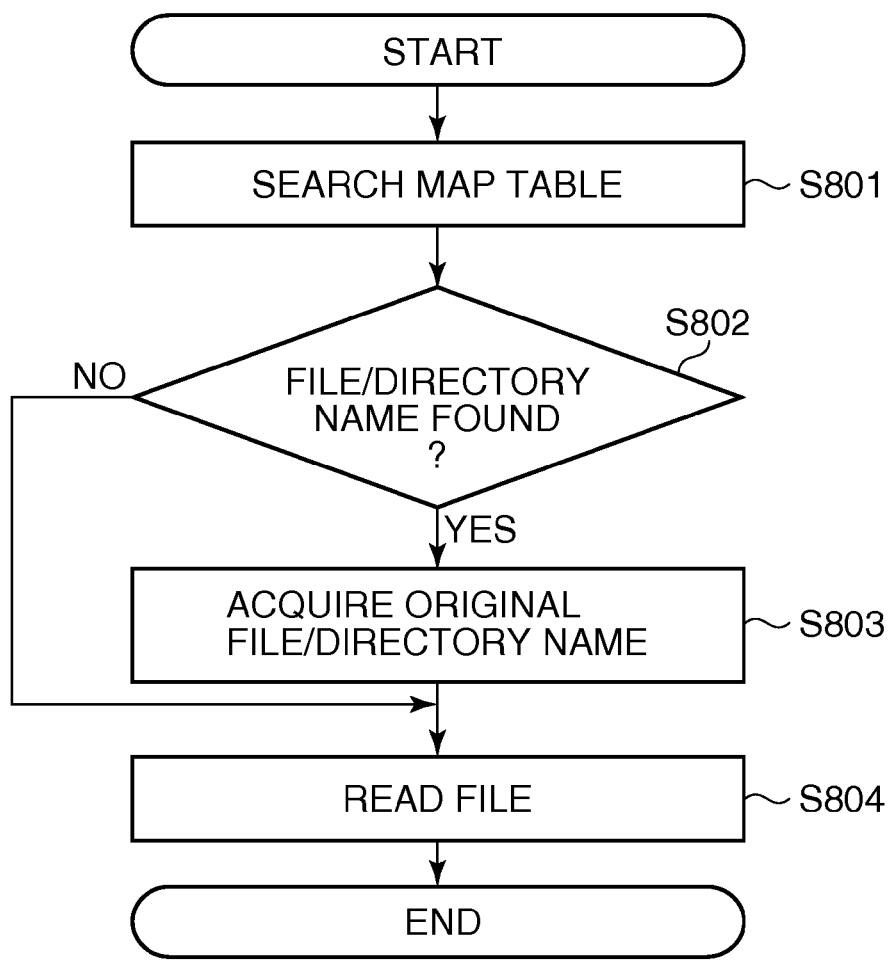
FIG. 8 is a flowchart of a first example of an image file reading process executed in one step in FIG. 5.

Next, the first example of the image file reading process executed in the step S502 in FIG. 5 will be described with reference to the flowchart in FIG. 8. It should be noted that the second example of the image file reading process executed in the step S502 in FIG. 5 will be described hereinafter with reference to the flowchart in FIG. 13.

The CPU 111 searches, based on a file/directory name selected by the user in the step S501 in FIG. 5, for a file/directory name so as to access the selected file/directory. Specifically, first, the CPU 111 searches for the file/directory name selected by the user on the map table illustrated by way of example in FIG. 7 (S801). In doing this, the file/directory name selected by the user is searched for in an area of the map table in FIG. 7, where the substitute file/directory names denoted by the respective reference numerals 701a and 702a are stored.

Then, the CPU 111 determines whether or not the selected file/directory name has been registered as a substitute file/directory name in the map table (S802). If the selected file/directory name has been registered as a substitute file/directory name in the map table, the CPU 111 acquires an original file/directory name registered in association with the substitute file/directory name (S803), and then the process proceeds to a step S804. For example, when the selected file name is the substitute file name denoted by the reference numeral 701a, the CPU 111 acquires an associated original file/directory name denoted by reference numeral 701.

Then, the CPU 111 reads a file based on the original file/directory name acquired in the step S803 (S804).

If it is determined in the step S802 that the selected file/directory name has not been registered as a substitute file/directory name in the map table, it means that the selected file/directory name is not a substitute file/directory name generated and registered in association therewith in the steps S603 and S604. In other words, it means that the file/directory name selected by the user is original. In this case, the CPU 111 performs file reading using the original file/directory name as it is (S804).

Figure 9:
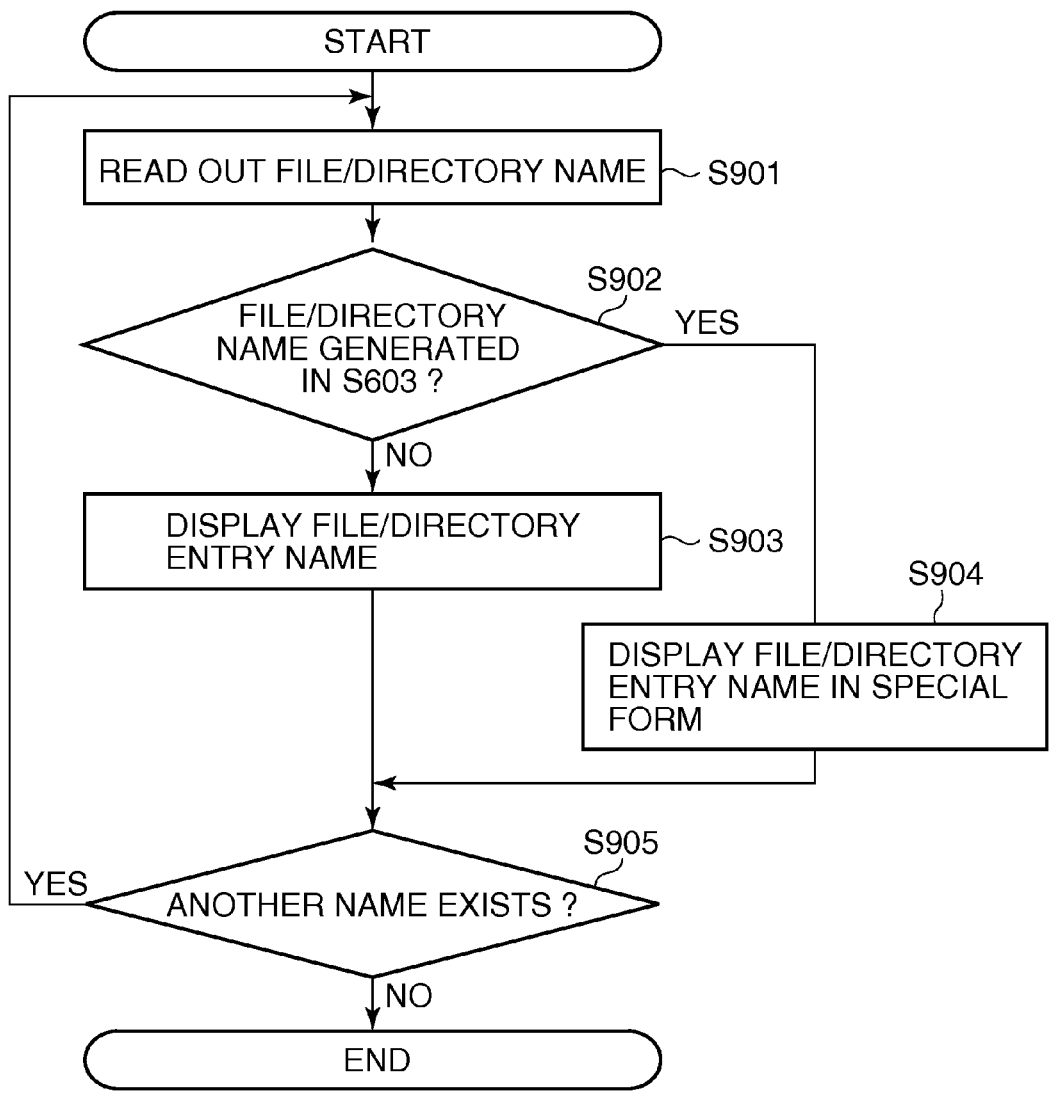
FIG. 9 is a flowchart of a file/directory name display process executed in one step in FIG. 5.

Next, the file/directory name display process executed in the step S501 will be described with reference to the flowchart shown in FIG. 9.

The CPU 111 reads out the file/directory name registered in the display file list in the file/directory name acquisition process described with reference to FIG. 6 (S901). Then, the CPU 111 determines whether or not the read-out file/directory name is a substitute file/directory name generated in the step S603 in FIG. 6 (S902).

This determination as to whether or not the read-out file/directory name is the substitute file/directory name is performed by determining whether or not the read-out file/directory name has the question mark "?" added to the head thereof as in the case of the names denoted by the reference numerals 701a and 702a in FIG. 7. The question mark "?" is a so-called forbidden filename character which generally cannot be used for a file/directory name. In short, by adding the question mark "?" to a file/directory name, it is possible to easily distinguish between an original file/directory name generated by a user and a substitute file/directory name.

It should be noted that, for example, a flag indicative of whether or not a read-out file/directory name is a substitute one may be set in association with each file/directory name in the display file list stored in the memory 131, without using a forbidden filename character, such as the question mark "?". In short, it is only required to enable the user to recognize a substitute name (identification information) indicative of an individual file/directory as such by some method.

If it is determined in the step S902 that the read-out file/directory name is an original one, the CPU 111 causes the liquid crystal display section 172 to display the original file/directory name in a normal display form (S903).

On the other hand, if it is determined that the read-out file/directory name is a substitute one, the CPU 111 causes the liquid crystal display section 172 to display the substitute file/directory name in a special display form (S904). The use of this special display form makes it possible to enable the user to easily recognize a substitute file/directory name.

The special display form can be configured as shown in FIG. 10, for example. In the FIG. 10 example, when a substitute file/directory name having the question mark "?" added thereto is focused (see reference numeral 1002), a message "Name is temporarily changed" is displayed in an upper status display area 1001 (see reference numeral 1001a).

Alternatively, a character string indicative of a substitute file/directory name may be displayed, always or when the substitute file/directory name is focused, in a special display form e.g. by making a display color of the characters of the character string different from a normal one.

Then, when there is a file/directory name yet to be read from the display file list (YES to S905), the process returns to the step S901, and the CPU 111 continues the file/directory name reading and display process. When all file/directory names are read out from the display file list (NO to S905), the CPU 111 terminates the file/directory name reading and display process.

Next, the second example of the file/directory name acquisition process will be described with reference to the flowchart in FIG. 11.

The CPU 111 acquires file/directory entry information from the removable medium (S1101). The entry information includes not only a file/directory name, but also attribute information including a flag for distinguishing between a file and a directory, an attribute flag, a file update date and time, and file size information. In the FAT file system, the entry information is recorded in the area called the directory entry.

Then, the CPU 111 determines whether or not the file/directory name acquired in the step S1101 includes character codes other than ASCII codes (S1102). This determination can be performed by the same method as described in the step S602 in FIG. 6.

If the file/directory name does not consist of ASCII codes alone, the associated file cannot be handled properly, and hence the CPU 111 generates a substitute file/directory name consisting of ASCII codes alone (S1103).

Figure 6:
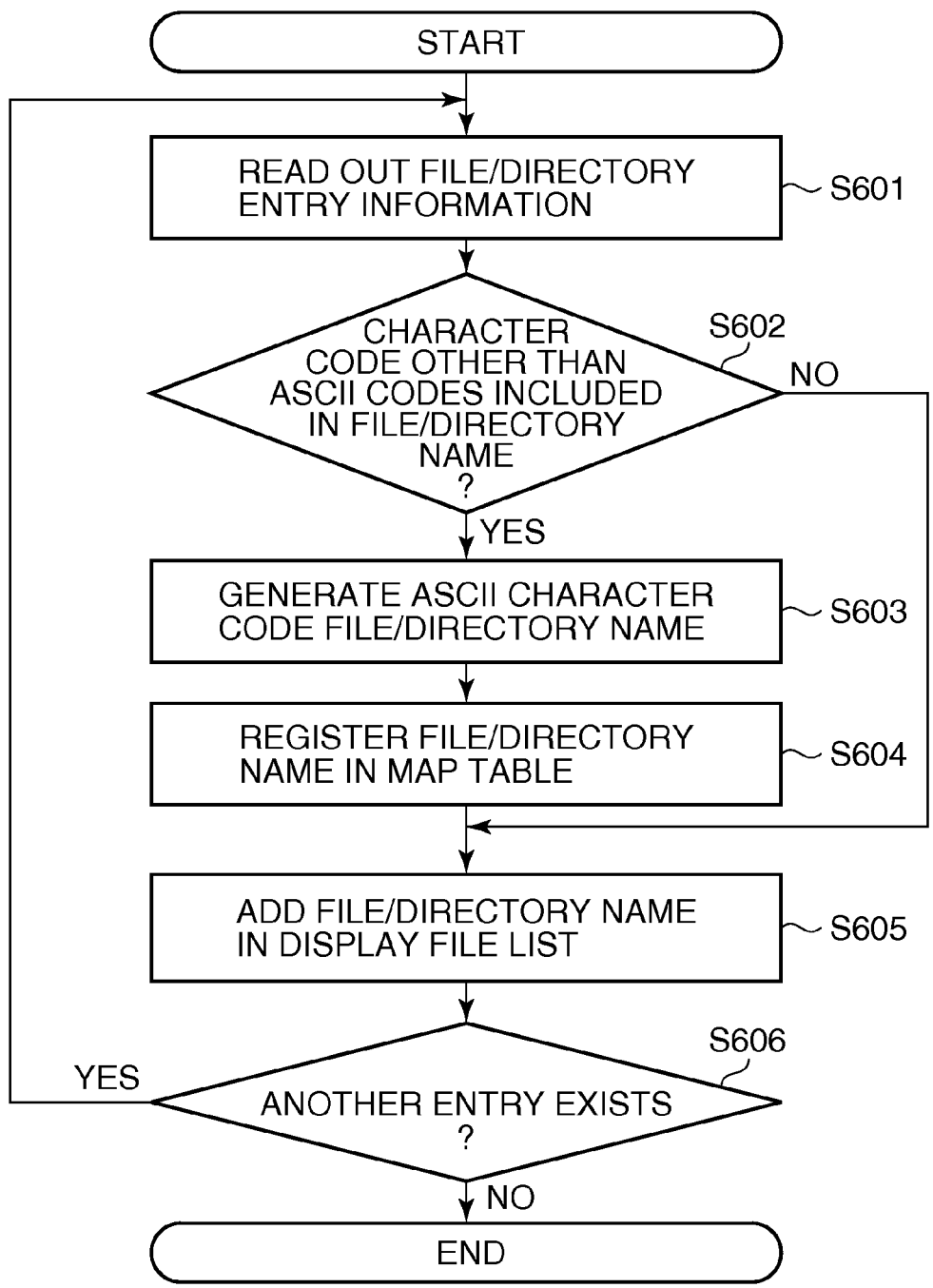
FIG. 6 is a flowchart of a first example of a file/directory name acquisition process executed in one step in FIG. 5.

In the FIG. 6 case, the substitute file/directory name is formed by "prefix+numerical value" so as to secure its uniqueness. When "prefix+numerical value" is used, a simple name can be obtained. However, with an increase or decrease in the number of files, the numerical value part changes, which causes a problem that a name assigned to the same file varies whenever the removable medium is inserted.

To solve this problem, in the step S1103, the CPU 111 generates the substitute file/directory name using the ASCII code, based on the attribute information, such as the attribute flag, the file update date and time, and the file size information, obtained in the step S1101. These pieces of attribute information are not changed unless a file is modified. Therefore, the same file constantly has the same ASCII code file name assigned thereto. This makes it possible to prevent a name assigned to the same file from being changed whenever the removable medium is inserted.

Steps S1104 to S1106 are identical to the steps S604 to S606 in FIG. 6, and therefore description thereof is omitted.

Next, the third example of the file/directory name acquisition process will be described with reference to the flowchart in FIG. 12. It should be noted that this file/directory name acquisition process is executed in the step S501 in FIG. 5.

The CPU 111 determines, based on shipping destination country or display language information stored in the memory 131 or in the ROM 133, whether or not to subject the file/directory name to character code conversion (S1201).

More specifically, the shipping destination country or display language information is basically used for determining a language (character code system) environment under which the image forming apparatus 10 is operated. For example, under an environment where a multi-byte character code system is not used, the image forming apparatus 10 using the 7-bit ASCII code as an internal code system is not required to execute the file/directory name conversion processing, i.e. the substitute file/directory name generation processing.

Further, even in a case where the apparatus is operated within a multi-byte character code system use zone, when a table for use in code conversion between the internal code system and a character code system different in the number of bytes from the internal code system exists in the apparatus, it is not required to perform the substitute file/directory name generation processing.

In the step S1201, the CPU 111 determines, based on settings configured as above, whether or not to subject the file/directory name to character code conversion. Then, if the settings are configured such that the file/directory name is to be subjected to character code conversion, the CPU 111 carries out quite the same processing as executed in the step S601 to S604 in FIG. 6, in steps S1202 to S1205.

On the other hand, if the settings are configured such that the file/directory name is not required to be subjected to character code conversion, the CPU 111 terminates the present process without carrying out the processing in the steps S1202 to S1205.

Figure 13:
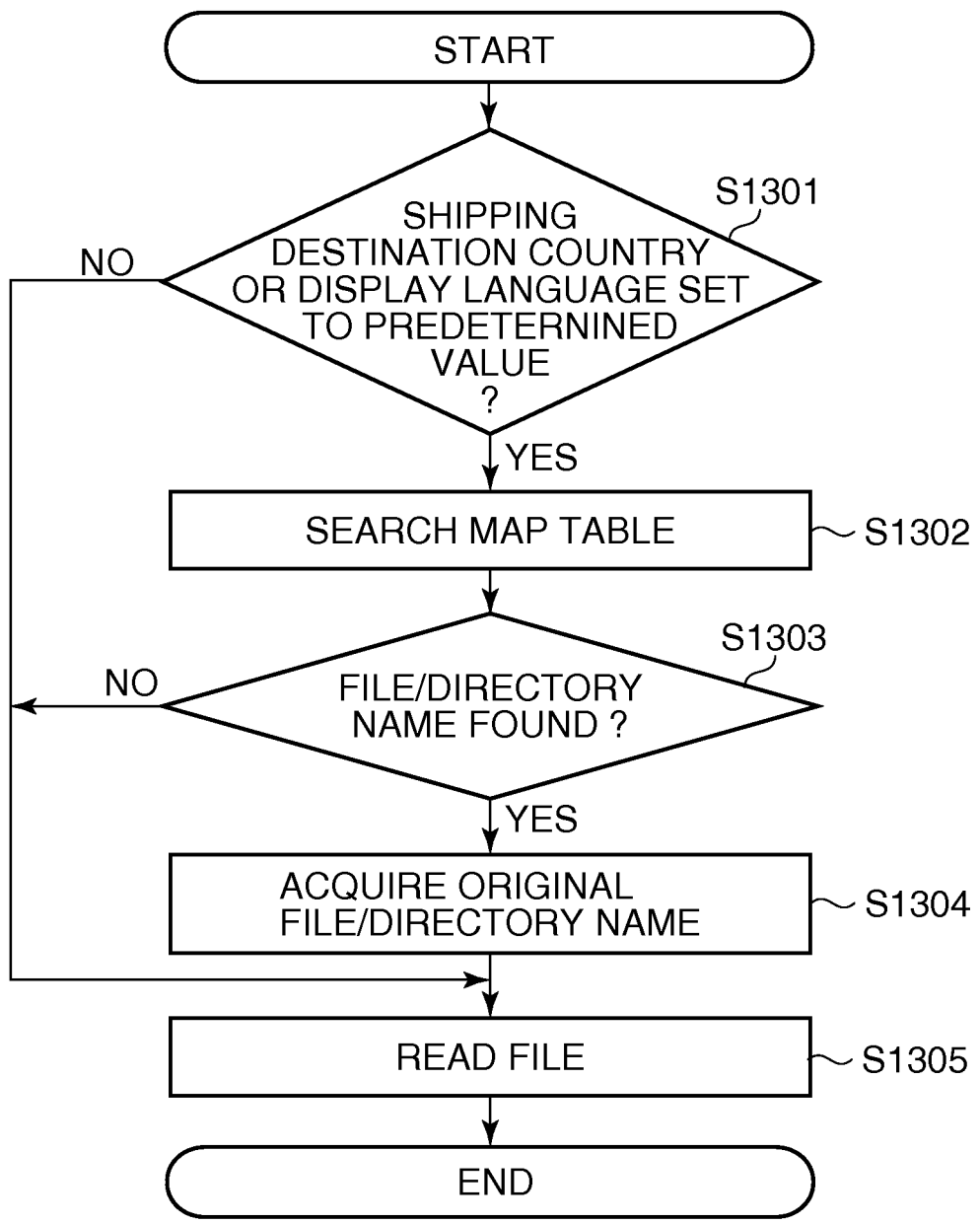
FIG. 13 is a flowchart of a second example of the image file reading process executed in the one step in FIG. 5.

Next, the second example of the file/directory name reading process executed in the step S502 in FIG. 5 will be described with reference to the flowchart in FIG. 13.

The CPU 111 determines, based on the shipping destination country or display language information stored in the memory 131 or the ROM 133, whether or not to search the map table (S1301).

More specifically, the shipping destination country or display language information is basically used for determining a language (character code system) environment under which the image forming apparatus 10 is operated. For example, under an environment where a multi-byte character code is not used, the image forming apparatus 10 using the 7-bit ASCII code as the internal code system is not required to execute the above-mentioned file/directory name conversion processing, i.e. the substitute file/directory name generation processing.

Further, even in a case where the image forming apparatus 10 is operated within the multi-byte character code use zone, when there is a table for converting multi-byte character codes into ASCII codes as internal codes in the image forming apparatus 10, it is not required to perform the above-mentioned file/directory name conversion processing. When the file/directory name conversion processing is not required to be performed, the map table is not generated, of course.

In the step S1301, the CPU 111 determines, based on settings configured as above, whether or not to search the map table. Then, if it is determined that map table search is required, the CPU 111 carries out quite the same processing as executed in the steps S801 to S804 in FIG. 8, in steps S1302 to S1305.

On the other hand, if it is determined that map table search is not required in the step S1301, the process skips the steps S1302 to S1304 and proceeds to the step S1305, wherein the CPU 111 carries out file reading processing based on the file/directory name.

As described above, according to the present embodiment, when a file/directory name is described by character codes which are not registered in the code conversion table for use in converting the external code system into the internal code system, the CPU 111 converts the unregistered file/directory name into a substitute file/directory name described by the internal code system.

The CPU 111 temporarily stores the substitute file/directory name in the map table in association with the original file/directory name. In the case of accessing the associated file, the CPU 111 acquires the original file/directory name before conversion from the map table. Then, when access to the file and predetermined processing, such as printing, are completed, the CPU 111 deletes the map table. It should be noted that the processing for deleting the map table is equivalent to the processing for erasing the substitute file/directory name and the original file/directory name from the map table.

Execution of this deletion processing makes it possible to reliably access files identified by file identification information described using more character code systems, without necessitating a large-capacity memory. In a case where a multi-byte character code is used as an internal character code, the number of bytes for one character is different depending on a character code system, and hence, conventionally, it is required to change a character code processing form according to the number of bytes for one character, which makes the processing of character strings in the apparatus complicated. The present embodiment, however, makes it possible to uniformly convert the number of bytes for one character into one byte whatever an original character code may be, to thereby simplify the processing of character strings in the apparatus.

It should be noted that the present invention is not limited to the above described embodiment, but it is also applicable e.g. to an information processing apparatus which is not provided with a code conversion table for use in converting external codes into internal codes and hence does not have the character code conversion function. Further, the present invention can be applied not only to an image forming apparatus and the like peripheral device, but also to a computer as the core of an information processing system.

It is to be understood that the present invention may also be accomplished by supplying a system or an apparatus with a storage medium in which a program code of software, which realizes the functions of the above described embodiment is stored, and causing a computer (or CPU (central processing unit) or MPU (main processing unit) of the system or apparatus to read out and execute the program code stored in the storage medium.

In this case, the program code itself read from the storage medium realizes the functions of the above described embodiment, and therefore the program code and the storage medium in which the program code is stored constitute the present invention.

Examples of the storage medium for supplying the program code include a floppy (registered trademark) disk, a hard disk, a magnetic-optical disk, an optical disk, such as a CD-ROM (compact disk read only memory), a CD-R (read only compact disk), a CD-RW (read/write compact disk), a DVD-ROM (digital video disk read only memory), a DVD-RAM (digital video disk ready access memory), a DVD-RW (read/write minus format digital video disk), or a DVD+RW (read/write plus format digital video disk), a magnetic tape, a nonvolatile memory card, and a ROM (read only memory). Alternatively, the program may be downloaded via a network.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A printing apparatus, comprising:
    an acquisition unit configured to acquire identification information for identifying a file stored in an external device connected to the printing apparatus;
    a determining unit configured to determine whether or not the identification information acquired by the acquisition unit is described using a predetermined character code set;

a generation unit configured to generate, in a case where said determination unit determines that the identification information acquired by the acquisition unit is not described using the predetermined character code set, substitute identification information, described using the predetermined character code set, of the identification information acquired by the acquisition unit, wherein the generation unit generates the substitute identification information without converting the identification information using a conversion table, wherein the substitute identification information includes a predetermined affix not derived from the identification information and numerical value which is incremented whenever the substitute identification information is generated by the generation unit, and wherein the generation unit does not generate the substitute identification information in a case where said determination unit determines that the identification information acquired by the acquisition unit is described using the predetermined character code set;

a storing unit configured to store the substitute identification information generated by the generation unit and the identification information acquired by the acquisition unit in association with each other; and a display unit configured to display on a display section the substitute identification information stored by the storing unit in a case where said determination unit determines that the identification information acquired by the acquisition unit is not described using the predetermined character code set, and to display the identification information acquired by the acquisition unit on the display section in a case where said determination unit determines that the identification information acquired by the acquisition unit is described using the predetermined character code set, wherein at least one of the acquisition unit, the determining unit, the generation unit, the storing unit, and the display unit is implemented, at least in part, by a hardware processor.

2. The printing apparatus according to claim 1, further comprising:
a deletion unit configured to delete the substitute identification information stored by the storing unit, after processing of the file is completed.

3. The printing apparatus according to claim 1, wherein said the acquisition unit acquires the identification information from a removable media in which the file is stored.

4. The printing apparatus according to claim 1, wherein the generation unit generates the substitute identification information in a case where said determining unit determines that the identification information acquired by the acquisition unit is not described using the predetermined character code set, and does not generate the substitute identification information in a case where said determining unit determines that the identification information acquired by the acquisition unit is described using only the predetermined character code set.

5. A printing method of processing a file by a printing apparatus, the method comprising:
an acquisition step of acquiring identification information for identifying a file stored in an external device connected to the printing apparatus;
a determining step of determining whether or not the identification information acquired in the acquisition step is described using a predetermined character code set;
a generation step of generating, in a case where said determination step determines that the identification information acquired by the acquisition step is not described using the predetermined character code set, substitute identification information, described using the predetermined character code set, of the identification information acquired by the acquisition step, wherein the generation step generates the substitute identification information without converting the identification information using a conversion table, wherein the substitute identification information includes a predetermined affix not derived from the identification information and numerical value which is incremented whenever the substitute identification information is generated by the generation step, and wherein the generation step does not generate the substitute identification information in a case where said determination step determines that the identification information acquired by the acquisition step is described using the predetermined character code set; and a storing step of storing the substitute identification information generated in the generation step and the identification information acquired in the acquisition step in association with each other; and a display step of displaying on a display section the substitute identification information stored by the storing step in a case where said determination step determines that the identification information acquired by the acquisition step is not described using the predetermined character code set, and to display the identification information acquired by the acquisition step on the display section in a case where said determination step determines that the identification information acquired by the acquisition step is described using the predetermined character code set.

6. A non-transitory computer-readable storage medium storing a program for causing a computer to execute a printing method for processing a file by a printing apparatus,
wherein the method comprises:
an acquisition step of acquiring identification information for identifying a file stored in an external device connected to the printing apparatus;
a determining step of determining whether or not the identification information acquired in the acquisition step is described using a predetermined character code set;
a generation step of generating, in a case where said determination step determines that the identification information acquired by the acquisition step is not described using the predetermined character code set, substitute identification information, described using the predetermined character code set, of the identification information acquired by the acquisition step, wherein the generation step generates the substitute identification information without converting the identification information using a conversion table, wherein the substitute identification information includes a predetermined affix not derived from the identification information and numerical value which is incremented whenever the substitute identification information is generated by the generation step, and wherein the generation step does not generate the substitute identification information in a case where said determination step determines that the identification information acquired by the acquisition step is described using the predetermined character code set; and a storing step of storing the substitute identification information generated in the generation step and the identification information acquired in the acquisition step in association with each other; and a display step of displaying on a display section the substitute identification information stored by the storing step in a case where said determination step determines that the identification information acquired by the acquisition step is not described using the predetermined character code set, and to display the identification information acquired by the acquisition step on the display section in a case where said determination step determines that the identification information acquired by the acquisition step is described using the predetermined character code set.

7. The printing apparatus according to claim 1, further comprising:
a searching unit configured to search the identification information by the substitute identification information;
a processing unit configured to process the file identified by the searched identification information.

8. The printing apparatus according to claim 1, further comprising:
a selection unit configured to select the substitute identification information displayed by the display unit;
a searching unit configured to search the identification information by the substitute identification information selected by the selection unit; and
a processing unit configured to process the file identified by the searched identification information.

9. The printing apparatus according to claim 7, further comprising:
a printing unit configured to print image data on a sheet based on the file processed by the processing unit.

10. The printing apparatus according to claim 1, wherein the predetermined character code set is ASCII code.

11. The printing apparatus according to claim 10, wherein the generation unit generates the substitute identification information described using the ASCII code.

12. The printing apparatus according to claim 1, the identification information indicates name of the file.

13. The printing apparatus according to claim 1, wherein the display unit displays information indicating that the substitute identification information displayed on the display section is substituted for the identification information.

14. A printing apparatus, comprising:
an acquisition unit configured to acquire identification information for identifying a file stored in an external device connected to the printing apparatus, wherein the identification information acquired by the acquisition unit is not described using a predetermined character code set;
a generation unit configured to generate, in a case where the identification information acquired by the acquisition unit is not described using the predetermined character code set, substitute identification information, described using the predetermined character code set, of the identification information acquired by the acquisition unit, wherein the generation unit generates the substitute identification information without converting the identification information using a conversion table, wherein the substitute identification information includes a predetermined affix not derived from the identification information and numerical value which is incremented whenever the substitute identification information is generated by the generation unit, and wherein the generation unit does not generate the substitute identification information in a case where the identification information acquired by the acquisition unit is described using the predetermined character code set;

a storing unit configured to store the substitute identification information generated by the generation unit and the identification information acquired by the acquisition unit in association with each other; and
a display unit configured to display on a display section the substitute identification information stored by the storing unit in a case where the identification information acquired by the acquisition unit is not described using the predetermined character code set, and to display the identification information acquired by the acquisition unit on the display section in a case where the identification information acquired by the acquisition unit is described using the predetermined character code set.

15. The printing apparatus according to claim 14, further comprising:
a deletion unit configured to delete the substitute identification information stored by the storing unit, after processing of the file is completed.

16. The printing apparatus according to claim 14, wherein said the acquisition unit acquires the identification information from a removable media in which the file is stored.

17. The printing apparatus according to claim 14, further comprising:
a searching unit configured to search the identification information by the substitute identification information; and
a processing unit configured to process the file identified by the searched identification information.

18. The printing apparatus according to claim 14, further comprising:
a selection unit configured to select the substitute identification information displayed by the display unit;
a searching unit configured to search the identification information by the substitute identification information selected by the selection unit; and
a processing unit configured to process the file identified by the searched identification information.

19. The printing apparatus according to claim 17, further comprising:
a printing unit configured to print image data on a sheet based on the file processed by the processing unit.

20. The printing apparatus according to claim 14, wherein the predetermined character code set is ASCII code.

21. The printing apparatus according to claim 20, wherein the generation unit generates the substitute identification information described using the ASCII code.

22. The printing apparatus according to claim 14, the generation unit generates the substitute identification information including predetermined characters.

23. The printing apparatus according to claim 22, wherein the generation unit generates the substitute identification information further including numerical value which is incremented whenever the substitute identification information is generated by the generation unit.

24. The printing apparatus according to claim 14, the identification information indicates name of the file.

25. The printing apparatus according to claim 14, wherein the display unit displays information indicating that the substitute identification information displayed on the display section is substituted for the identification information.

26. A printing method performed by a printing apparatus, the method comprising:
an acquisition step of acquiring identification information for identifying a file stored in an external device connected to the printing apparatus, wherein the identification information acquired by the acquisition step is not described using a predetermined character code set;

a generation step of generating, in a case where the identification information acquired by the acquisition step is not described using the predetermined character code set, substitute identification information, described using the predetermined character code set, of the identification information acquired by the acquisition step, wherein the generation step generates the substitute identification information without converting the identification information using a conversion table, wherein the substitute identification information includes a predetermined affix not derived from the identification information and numerical value which is incremented whenever the substitute identification information is generated by the generation step, and wherein the generation step does not generate the substitute identification information in a case where the identification information acquired by the acquisition unit is described using the predetermined character code set;

a storing step of storing the substitute identification information generated by the generation step and the identification information acquired by the acquisition step in association with each other; and a display step of displaying on a display section the substitute identification information stored by the storing step in a case where the identification information acquired by the acquisition step is not described using the predetermined character code set, and to display the identification information acquired by the acquisition step on the display section in a case where the identification information acquired by the acquisition step is described using the predetermined character code set.

27. A non-transitory computer-readable storage medium storing a program for causing a computer to execute a printing method performed by a printing apparatus, wherein the method comprises:

an acquisition step of acquiring identification information for identifying a file stored in an external device connected to the printing apparatus, wherein the identification information acquired by the acquisition step is not described using a predetermined character code set;

a generation step of generating, in a case where the identification information acquired by the acquisition step is not described using the predetermined character code set, substitute identification information, described using the predetermined character code set, of the identification information acquired by the acquisition step, wherein the generation step generates the substitute identification information without converting the identification information using a conversion table, wherein the substitute identification information includes a predetermined affix not derived from the identification information and numerical value which is incremented whenever the substitute identification information is generated by the generation step, and wherein the generation step does not generate the substitute identification information in a case where the identification information acquired by the acquisition unit is described using the predetermined character code set;

a storing step of storing the substitute identification information generated by the generation step and the identification information acquired by the acquisition step in association with each other; and a display step of displaying on a display section the substitute identification information stored by the storing step in a case where the identification information acquired by the acquisition step is not described using the predetermined character code set, and to display the identification information acquired by the acquisition step on the display section in a case where the identification information acquired by the acquisition step is described using the predetermined character code set.

* * * * *